United States Patent
Ichikawa et al.

(10) Patent No.: US 6,948,243 B2
(45) Date of Patent: Sep. 27, 2005

(54) ASSEMBLY METHOD USING MARKED INFORMATION AND ASSEMBLY ASSEMBLED BY SAID ASSEMBLING METHOD

(75) Inventors: Yukihito Ichikawa, Nagoya (JP); Eiji Ito, Yokkaichi (JP); Koichi Ikeshima, Okazaki (JP); Masayasu Ishikawa, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 158 days.

(21) Appl. No.: 10/169,847

(22) PCT Filed: Nov. 16, 2001

(86) PCT No.: PCT/JP01/10003

§ 371 (c)(1),
(2), (4) Date: Jul. 10, 2002

(87) PCT Pub. No.: WO02/40215

PCT Pub. Date: May 23, 2002

(65) Prior Publication Data

US 2003/0000089 A1 Jan. 2, 2003

(30) Foreign Application Priority Data

Nov. 17, 2000 (JP) ........................................ 2000-351679

(51) Int. Cl.⁷ ........................... B21D 51/16; B23P 11/00
(52) U.S. Cl. ......................... 29/890; 29/407.05; 29/508; 422/179
(58) Field of Search ...................... 29/890, 508, 516, 29/517, 407.05; 422/179, 168, 177, 180

(56) References Cited

U.S. PATENT DOCUMENTS

| | | | | |
|---|---|---|---|---|
| 4,377,890 A | * | 3/1983 | Miller | .......................... 445/38 |
| 5,729,902 A | * | 3/1998 | Wieres et al. | ................. 29/890 |
| 5,755,025 A | | 5/1998 | Wirth et al. | ................... 29/890 |
| 5,943,771 A | * | 8/1999 | Schmitt | ......................... 29/890 |
| 6,389,693 B1 | * | 5/2002 | Aranda et al. | ................. 29/890 |
| 6,393,249 B1 | * | 5/2002 | Aslam et al. | ................ 399/333 |
| 6,591,497 B2 | * | 7/2003 | Foster et al. | ................... 29/890 |
| 2002/0057998 A1 | * | 5/2002 | Foster et al. | ................. 422/179 |
| 2002/0189097 A1 | * | 12/2002 | Collins et al. | ................ 29/890 |
| 2003/0000088 A1 | * | 1/2003 | Mayfield | ....................... 29/890 |
| 2003/0097752 A1 | * | 5/2003 | Shirk et al. | .................... 29/890 |

FOREIGN PATENT DOCUMENTS

| | | |
|---|---|---|
| EP | 0681095 | 11/1995 |
| EP | 0 918 145 A2 | 5/1999 |
| EP | 0 982 480 A2 A3 | 3/2000 |
| JP | 63-7847 | 1/1988 |
| JP | 63-168517 | 7/1988 |
| JP | 2-126016 | 10/1990 |
| JP | 7-47285 | 2/1995 |
| JP | 9-158720 | 6/1997 |
| JP | 9-314431 | 12/1997 |
| JP | 11-258013 | 9/1999 |
| JP | 2000-45759 | 2/2000 |
| JP | 2000-204931 | 7/2000 |
| JP | 2000-291424 | 10/2000 |

\* cited by examiner

Primary Examiner—Marc Jimenez
(74) Attorney, Agent, or Firm—Steptoe & Johnson LLP

(57) ABSTRACT

A method for assembling a cell structure in a metal vessel, including reading information as indicia located on a surface of a compressible material having a cushioning property, the information regarding the thickness and/or bulk density of the compressible material; selecting a cell structure, a metal vessel, and a compressible material which, when assembled as a cell structure housed in a metal vessel, have a proper holding condition based on the read information; assembling the selected cell structure in the selected metal vessel via the selected compressible material, the compressible material being located in a compressed state between an outer periphery of the cell structure and the metal vessel to hold the selected cell structure in the selected metal vessel.

18 Claims, No Drawings

ASSEMBLY METHOD USING MARKED INFORMATION AND ASSEMBLY ASSEMBLED BY SAID ASSEMBLING METHOD

TECHNICAL FIELD

The present invention relates to a method for assembling a cell structure housed and held in a metal vessel via a compressible material. More particularly, it relates to a method for members meeting a proper combination condition by marking inherent information on the surface of a member constituting the assembly in advance and by utilizing the information. The present invention can be applied to a catalyst carrier or a filter for purification of exhaust gas of internal combustion engine or for deodorization, or to a catalyst carrier or a filter used for chemical reaction equipment utilizing catalytic action, for example, a reformer for fuel cell.

BACKGROUND ART

As an assembly used for a catalytic converter, a filter, a heat exchanger, or the like used for purification of exhaust gas of an internal combustion engine or chemical reaction equipment utilizing catalytic action, there is known an assembly in which a cell structure is housed and held (canned) in a metal vessel by arranging a compressible material having a cushioning property between the cell structure and the tubular metal vessel (can) and by applying a predetermined mounting pressure to the cell structure via the compressible material.

For example, in the case where such an assembly is used as a catalytic converter for purifying automobile exhaust gas, a precious metal such as platinum, palladium, or rhodium is carried as a dispersion on a ceramic honeycomb structure, which is one kind of cell structure, as a catalyst component, and the honeycomb structure carrying the precious metal is housed and held in a metal vessel (can) via a ceramic mat etc. and is mounted on an exhaust system.

It is desirable that the cell structure have a high strength because it is held in the metal vessel by applying a mounting pressure onto the outer peripheral surface thereof as described above. For the honeycomb structure used as a catalyst carrier for purifying automobile exhaust gas, however, the thickness of cell wall has been decreased to improve the purification performance, and accordingly the strength level has been decreased.

The strength of cell structure can be measured by an "isostatic fracture strength test". This test is conducted by putting a cell structure in a tubular rubber vessel, covering the vessel with an aluminum plate and performing isostatic compression in water, which simulates the compressive load in the case where the outer peripheral surface of cell structure is held by the can of converter. The isostatic strength is designated by an applied pressure value at the time when the carrier is fractured, and is specified in Automobile Standards JASO Standards M505-87 issued by Society of Automotive Engineers of Japan, Inc.

It has been found that it is generally very difficult for a ceramic honeycomb structure used as a catalyst carrier for an automobile exhaust gas purifying converter to keep an isostatic strength of 10 kg/cm$^2$ or higher if the cell wall thickness is 0.11 mm or smaller and the open area percentage exceeds 85%.

In the case where a specific pressure higher than a design specific pressure set at the time of canning design is produced in actual canning and the specific pressure exceeds the isostatic strength of cell structure in some portion, there is a danger that the structure fractures in that portion. As the thickness of cell wall of cell structure decreases and thus the strength level of structure decreases, the design specific pressure must be decreased, and thus it is necessary to restrain an abnormal rise in specific pressure in actual canning and to decrease the variations in specific pressure to the utmost. If the actual specific pressure is equal to the design specific pressure, intended canning design can be made ideally.

Further, the cell structure may be fractured in the case where because a gap between the cell structure and the metal vessel for containing the cell structure is irregular due to poor accuracy of external shape of cell structure, the compressive pressure acting on the outer peripheral portion of cell structure is nonuniform, so that a high holding specific pressure acts partially.

On the other hand, if the specific pressure is decreased too much, the cell structure cannot be kept being held in the metal vessel because the cell structure is subjected to a high-temperature exhaust gas flow or vibrations in actual service environments. Therefore, the necessary minimum specific pressure exists. As the wall thickness of cell structure decreases, the isostatic strength level of cell structure decreases, so that the mounting pressure for holding the cell structure must also be decreased to the utmost while the minimum specific pressure necessary for holding the cell structure is maintained. As the level of mounting pressure decreases, variations in specific pressure must be decreased, that is, more even specific pressure distribution must be provided.

In order to house and hold the cell structure in the metal vessel in a proper state, it is desirable to decrease the variations in size and shape of each part of the cell structure, the compressible material, and the metal vessel to the utmost. However, since the ceramic honeycomb structure used as a catalyst carrier as described above is dried as it is after being extrusion molded, and after being cut to a predetermined length, it is housed in the metal vessel in a state of being fired, the outside-diameter dimension of honeycomb structure involves dimensional variations and deformations in all processes of molding, drying, and firing. Therefore, the honeycomb structure has very large variations in size and shape as compared with a metal work. Therefore, the problem is how the influence of outside-diameter dimension of ceramic honeycomb structure is kept little when the honeycomb structure is housed in the metal vessel.

The present invention has been made to solve the above problems, and accordingly an object thereof is to provide an assembling method in which when an assembly produced by housing and holding a cell structure in a metal vessel via a compressible material, even if the external-shape dimension of member such as the cell structure constituting the assembly has variations, the influence of variations is averted, and a proper holding state without a fracture etc. of cell structure can be obtained.

DISCLOSURE OF THE INVENTION

According to the present invention, there is provided an assembling method for an assembly in which a cell structure is housed and held in a metal vessel via a compressible material by arranging the compressible material having a cushioning property between the outer periphery of the cell structure and the tubular metal vessel in a compressed state and applying a mounting pressure to the cell structure via the compressible material to hold the cell structure in the metal vessel, characterized by marking an information regarding the thickness and/or bulk density of said compressible material on the material surface prior to the start of an assembling process, and reading said information in the assembling process, and a cell structure, a metal vessel, and selecting a compressible material which have a proper holding condition based on the read information (a first aspect of the present invention).

Further, according to the present invention, there is provided an assembly assembled by the above-described method (a second aspect of the present invention).

BEST MODE FOR CARRYING OUT THE INVENTION

As described above, an assembly used for a catalytic converter or the like, in which a cell structure is housed and held in a metal vessel via a compressible material, is assembled by arranging the compressible material having a cushioning property between the outer periphery of cell structure and the tubular metal vessel in a compressed state and by applying a mounting pressure to the cell structure via the compressible material to hold the cell structure in the metal vessel.

A first aspect of the present invention has a feature described below. In the above-described assembling method for the assembly, information regarding the thickness and/or the bulk density of the compressible material has been marked on the material's surface prior to the start of an assembling process, and in the assembling process, the information is read, and a cell structure, a metal vessel and the compressible material which have a proper holding condition are selected based on the read information.

As a factor that exerts an influence on the specific pressure of the cell structure, the thickness and/or bulk density of the compressible material arranged between the cell structure and the metal vessel can be cited in addition to the dimensions of the cell structure and the metal vessel. As described above, based on the information regarding these factors which is marked on the material surface, a cell structure, a metal vessel, and a compressible material which provide a combination of proper dimensions are selected, by which the cell structure housed and held in the metal vessel is subjected to a specific pressure in a proper range.

In the first aspect of the present invention, as the marking format of information, characters or a bar code can be used. The information can be marked by ink application, laser, stamping using a stamp, or the like. Alternatively, the information may be printed on a label, and the label may be affixed onto the material's surface. In the case where the information is marked by ink, the ink jet method or thermal transfer method is preferably used.

As the compressible material having a cushioning property, one kind of material or a composite material consisting of two or more kinds of materials selected from a group consisting of a metallic wire mesh, an intumescent mat formed by ceramic fiber and vermiculite, and non-intumescent mat mainly containing ceramic fiber and not containing vermiculite is preferably used.

Especially when the cell structure is a thin wall construction, if a non-intumescent mat mainly containing ceramic fiber such as alumina, high alumina, mullite, silicon carbide, silicon nitride, zirconia, and titania and not containing an intumescent material such as vermiculite is used, a compressive force acting on the outer periphery of cell structure in the practical temperature range does not vary greatly, and moreover the compressive force preferably acts on the whole of the outer periphery of cell structure substantially uniformly.

As a method for housing the cell structure in the metal vessel and applying a mounting pressure to the cell structure via the compressible material, any of the clamshell method, stuffing method, tourniquet method, swaging method, and rotary forging method is preferably used.

As a cell structure, a honeycomb structure having a plurality of cell passages formed by a plurality of walls, the thickness of cell wall being 0.11 mm or smaller, and the open area percentage being 85% or more, is preferable. Further, as a honeycomb structure, a structure having an external wall forming an outside-diameter contour around the structure, the thickness of external wall being at least 0.05 mm, is preferable. As a cell structure used in the present invention, in addition to the above-described honeycomb structure, a foamed structure may be used.

The cell structure is preferably formed of one kind of ceramic material or a composite consisting of two or more kinds of ceramic materials selected from a group consisting of cordierite, alumina, mullite, lithium aluminum silicate, aluminum titanate, titania, zirconia, silicon nitride, aluminum nitride, and silicon carbide. Also, the cell structure formed of one kind of adsorbing material selected from a group consisting of activated carbon, silica gel, and zeolite can be used suitably.

The cell shape of honeycomb structure manufactured by extrusion molding may be triangular, quadrangular, hexagonal, round, etc. Generally, the honeycomb structure having a square shape, which is one of quadrangular shapes, is often used, and in recent years, the honeycomb structure having a hexagonal shape has been used increasingly.

In the case where the cell structure is used as a catalytic converter, a catalyst component must be carried on the cell structure. Usually, after the catalyst component is carried on the cell structure, the cell structure is housed and held in the metal vessel. However, the method may be such that after the cell structure is housed and held in the metal vessel, the catalyst component is carried on the cell structure.

A second aspect of the present invention provides an assembly assembled by the method in accordance with the first aspect of the present invention. Since the cell structure is held in the metal vessel with a proper mounting pressure, the assembly can be used suitably for a catalytic converter for purifying automobile exhaust gas and other applications.

The assembly may be constructed so that a plurality of cell structures are arranged in series along the cell passage direction in one metal vessel via a compressible material having a cushioning property. Also, a plurality of assemblies each of which houses and holds one cell structure in one metal vessel via a compressible material having a cushioning property are arranged in series along the cell passage direction of the cell structure in one metallic outer casing. In the present invention, however, the size of metal vessel is changed according to the outside-diameter dimension of individual honeycomb structure. Therefore, in the case where a plurality of metal vessels are connected to each other, it is desirable to connect the metal vessels that have a size as close as possible to each other.

EXAMPLE

Hereunder, the present invention will be described in detail giving an example of the case where a catalytic converter is manufactured by using a honeycomb structure as a cell structure. The present invention is not limited to this example.

As a method for marking information such as characters or a bar code on a compressible material, a method using an ink jet printer is desirable in terms of treatment of large quantities of members because this method has a high printing speed and is of non-contact type. In particular, a marking method using a laser is preferable to the ink jet method in terms of maintenance because this method does not require ink and pretreatment.

The bulk density inspection of compressible material is carried out at the final stage of manufacturing process. For example, when the information is marked by ink jet, the information regarding the measured bulk density is transmitted directly to the ink jet printer.

One example of conditions in the case where the information is marked by ink jet will be described below. Also, for reference, one example of conditions in the case where the information is marked by stamping and label affixture will be described additionally.

Example of Ink Jet

Ink Jet Device:
  S4 Plus manufactured by Imaje Ltd.
Type of Ink:
  Heat resisting ink (at ordinary temperature: dark brown colored, after heat treatment: orange colored)
Compressible Material:
  Non-intumescent mat consisting mainly ceramic fiber
Format of Information Carried on Compressible Material:

Numeral
Information Carried on Compressible Material:
  Bulk density of compressible material Example of Stamping Ink Component:
(1) Ink pigment
  Fine powder of cobalt oxide (CoO), chromium oxide ($Cr_2O_3$), and iron oxide ($Fe_2O_3$) 40% (color: black at ordinary temperature and after heat treatment)
(2) Synthetic resin: 50%
(3) Water: 10%
Compressible Material:
  Non-intumescent mat consisting mainly ceramic fiber
Format of Information Carried on Compressible Material:

Numeral
Information Carried on Compressible Material:
  Bulk density of compressible material Example of Label Affixation Printer:
  S4 Plus manufactured by Imerge Ltd.
Type of Ink:
  Ordinary ink (black)
Compressible Material:
  Non-intumescent mat consisting mainly ceramic fiber
Format of Information Carried on Compressible Material:
  Bar code (numeral is put additionally)
Information Carried on Compressible Material:
  Bulk density of compressible material In a canning process, the bar code or numerals that carry the information regarding the outside-diameter dimension of honeycomb structure and the thickness and/or bulk density of compressible material are read by a bar-code reader or the like in advance. The read dimensional information is sent momentarily to the metal vessel manufacturing line. The metal vessel is formed by rounding a thin metal sheet to a predetermined dimension by using a press jig and by joining the joint portions by welding to form a can shape. The aforementioned information is sent to the can manufacturing device, and the dimension of can is determined based on this information. Thus, the clearance between the honeycomb structure and the metal vessel (can) is controlled, and the optimum combination is realized.

The specific pressure also varies depending on the bulk density of compressible material interposed between the honeycomb structure and the metal vessel. Therefore, in order to obtain the optimum combination of the clearance between the honeycomb structure and the metal vessel and the bulk density of compressible material, the metal vessel and the compressible material can be selected based on the bar-code information on the honeycomb structure.

When the character information can be printed by the ink jet method, the laser marking method or the like. In this case, the printed character information is photographed by a CCD camera, and is recognized by the pattern matching method. This method is to register characters in advance and to select a pattern closest to the registered characters from the shading information of photographed characters. The inventors read the outside-diameter dimension marked by the aforementioned laser marking method and the numerical information about mass by using an F350 image recognizer manufactured by Omron Corp., and verified that the information could be transmitted correctly.

The reading principle of bar-code reader is as described below. A laser beam is irradiated on a bar-code label, and the irregularly reflected light is received by the light-intercepting portion of bar-code reader. The irregularly reflected light produces a difference in intensity due to a difference in reflectance between space and bar. By changing this difference to an ON/OFF digital signal, the space and bar are discriminated, whereby the bar code is read. Therefore, even in the case of bar code, when the difference in intensity of irregularly reflected light (PCS) is small, it is difficult to read the bar code using the bar-code reader, so that the aforementioned image recognizing method is effective.

As a general canning method, any method of the clamshell method, the stuffing method, or the tourniquet method is used. Besides, a method in which the outside-diameter dimension of the metal vessel is decreased by applying a compressive pressure from the outside via a tap (pressurizing type) using the technology for plastic working of metal (swaging method) is also carried out.

Further, by using a method in which the outer peripheral surface of the metal vessel is pressed by plastic working using a working jig while the metal vessel is rotated (what is called a rotary forging method), the outside diameter of the metal vessel can be decreased, and thus a specific pressure can be applied. By the use of this method, in combination with the working in which both ends of can are drawn into a cone shape by spinning, which has been done recently, working ranging from canning to cone forming can be performed on an integrated working line.

In the above-described clamshell method, stuffing method, and toruniquet method, a compressive elasticity holding material (compressible material) is wound around the honeycomb structure in advance. In the clamshell method, the honeycomb structure with the compressible material being wound is held by a two-piece metal vessel while a load is applied, and the joint face (collar) portions are welded to form an integrated vessel. In the stuffing method, the honeycomb structure with the compressible material being wound is pressed into an integrated metal vessel by using a guide. In the tourniquet method, a metal plate serving as the metal vessel is wound around the honeycomb structure with the compressible material being wound and is pulled to provide a specific pressure, and the joint portions of the metal plate are welded and fixed.

According to the clamshell method, when the honeycomb structure is pressed from the upside and downside, a shift of mat (compressive material) occurs. In the stuffing method, when the honeycomb structure is inserted into the metal vessel, a shift of mat occurs on the insertion side. Therefore, if the shifted portion spreads to a wide range, the specific pressure increases as a whole as well.

A method suitable for applying a specific pressure is to hold the honeycomb structure in the metal vessel while a specific pressure is applied with a shift of relative position of the mat and the metal vessel being made as small as possible. From this point of view, the tourniquet method, swaging method, and rotary forging method are desirable because the can surrounds the cell structure wound with the compressible material prior to the application of a specific pressure so that the shift of relative position of the can and the compressible material is small. A procedure can also be carried out in which the stuffing method is used only to arrange the honeycomb structure in the can and the swaging method or the rotary forging method is used to apply a specific pressure.

INDUSTRIAL APPLICABILITY

As described above, according to the present invention, when an assembly in which a cell structure is housed and held in a metal vessel via a compressible material, even if the external-shape dimension of the cell structure etc. constituting the assembly varies, the influence of variation can be made little, and a proper holding state without a fracture etc. of cell structure can be obtained easily.

What is claimed is:

1. An assembling method for assembling a cell structure in a metal vessel, comprising:
    marking information as indicia located on a surface of a compressible material having a cushioning property, the information regarding the thickness and/or bulk density of said compressible material;
    reading said information;
    selecting a cell structure, a metal vessel, and a compressible material which, when assembled as a cell structure housed in a metal vessel, have a specified holding condition based on the read information;
    assembling said selected cell structure in said selected metal vessel via said selected compressible material, said compressible material being located in a compressed state between an outer periphery of said cell structure and said metal vessel; and
    applying, after assembling said selected cell structure in said selected vessel, a mounting pressure to said selected cell structure via said selected compressible material to hold said selected cell structure in said selected metal vessel.

2. The assembling method according to claim 1, wherein said indicia comprise characters.

3. The assembling method according to claim 2, wherein said indicia comprise ink markings.

4. The assembling method according to claim 3, wherein said ink markings are applied to a surface of said compressible material by an ink jet method or a thermal transfer method.

5. The assembling method according to claim 2, wherein said indicia are marked by a laser.

6. The assembling method according to claim 2, wherein said indicia are marked by stamping a surface of the compressible material using a stamp.

7. The assembling method according to claim 2, wherein said indicia are marked by printing said information on a label, and affixing said label to said member surface of the compressible material.

8. The assembling method according to claim 1, wherein said indicia comprise a bar code.

9. The assembling method according to claim 8, wherein said indicia comprise ink markings.

10. The assembling method according to claim 9, wherein said ink markings are applied to a surface of said compressible material by an ink jet method or a thermal transfer method.

11. The assembling method according to claim 8, wherein said indicia are marked by a laser.

12. The assembling method according to claim 8, wherein said indicia are marked by stamping a surface of the compressible material using a stamp.

13. The assembling method according to claim 8, wherein said indicia are marked by printing said information on a label, and affixing said label to said surface of the compressible material.

14. The assembling method according to claim 1, wherein said compressible material is a homogeneous material or a composite material comprising two or more kinds of materials selected from the group consisting of a metallic wire mesh, an intumescent mat comprising ceramic fiber and vermiculite, and a non-intumescent mat comprising ceramic fiber and no vermiculite.

15. The assembling method according to claim 1, wherein assembling said selected cell structure in said metal vessel and applying a mounting pressure to said selected cell structure via said selected compressible material is a method selected from the group consisting of a clamshell method, a stuffing method, a tourniquet method, a swaging method, and a rotary forging method.

16. The assembling method according to claim 1, further comprising adding a catalyst component to said selected cell structure before said selected cell structure is housed and held in said selected metal vessel.

17. The assembling method according to claim 1, further comprising adding a catalyst component to said selected cell structure after said selected said cell structure is housed and held in said selected metal vessel.

18. A method for assembling a cell structure in a metal vessel, comprising:
    providing a compressible material having a cushioning property wherein information regarding the thickness and/or bulk density of said compressible material is recorded as indicia located on a surface of said compressible material;
    reading said information and selecting a cell structure, a metal vessel, and a compressible material which, when assembled as a cell structure housed in a metal vessel, have a specified holding condition based on the read information;
    assembling said selected cell structure in said selected metal vessel via said selected compressible material, said compressible material being located in a compressed state between an outer periphery of said cell structure and said metal vessel; and
    applying, after assembling said selected cell structure in said selected vessel, a mounting pressure to said selected cell structure via said selected compressible material to hold said selected cell structure in said selected metal vessel.

* * * * *